United States Patent

Roper

(10) Patent No.: US 6,622,831 B2
(45) Date of Patent: Sep. 23, 2003

(54) SOFT-START, SOFT-RETURN GAS SPRING

(76) Inventor: Ralph Roper, 2930 Somerset Bay, Indianapolis, IN (US) 46240

(*) Notice: Subject to any disclaimer, the term of this patent is extended or adjusted under 35 U.S.C. 154(b) by 0 days.

(21) Appl. No.: 10/152,425

(22) Filed: May 21, 2002

(65) Prior Publication Data

US 2002/0130453 A1 Sep. 19, 2002

Related U.S. Application Data

(63) Continuation of application No. 09/783,634, filed on Feb. 14, 2001, now Pat. No. 6,390,457.

(51) Int. Cl.⁷ ................................................. F16F 9/00
(52) U.S. Cl. .................. 188/315; 188/322.15; 188/284
(58) Field of Search ................................ 267/130, 119, 267/64.11, 64.13, 64.15, 64.16, 64.26; 188/315, 281, 282.1, 283, 284, 322.13, 322.15, 322.16, 322.18, 322.22, 269

(56) References Cited

U.S. PATENT DOCUMENTS

| | | | |
|---|---|---|---|
| 2,867,298 A | 10/1959 | Roder | |
| 3,734,478 A | 5/1973 | Lohr | |
| 3,865,356 A | 2/1975 | Wossner | |
| 4,095,470 A | 6/1978 | Sliger | |
| 4,139,182 A | * 2/1979 | Nagase et al. | 188/284 |
| 4,156,523 A | 5/1979 | Bauer | |
| 4,503,951 A | 3/1985 | Imaizumi | |
| 4,561,524 A | * 12/1985 | Mizumukai et al. | 188/322.15 |
| 4,706,787 A | * 11/1987 | Wossner | 267/64.15 |
| 4,796,871 A | 1/1989 | Bauer et al. | |
| 4,971,180 A | * 11/1990 | Kobayashi et al. | 188/315 |
| 5,190,126 A | 3/1993 | Curnutt | |
| 5,533,372 A | 7/1996 | Roper et al. | |
| 5,702,092 A | 12/1997 | Farris et al. | |
| 5,722,643 A | 3/1998 | Chamberlin et al. | |
| 5,702,092 A | 7/2000 | Farris et al. | |
| 6,129,343 A | 10/2000 | Ecarnot | |
| 6,390,457 B1 | * 5/2002 | Roper | 188/282.1 |

FOREIGN PATENT DOCUMENTS

| | | |
|---|---|---|
| DE | 4000245 C1 | 2/1991 |
| GB | 0410519 A | 5/1934 |
| GB | 0906848 A | 9/1962 |
| GB | 1241337 A | 8/1971 |
| GB | 2229513 A | 9/1990 |

* cited by examiner

Primary Examiner—Christopher P. Schwartz
Assistant Examiner—Melanie Torres
(74) Attorney, Agent, or Firm—Woodard, Emhardt, Moriarty McNett & Henry LLP

(57) ABSTRACT

A gas spring includes an outer tube; a base plate; a head plate; an inner tube mounted to extend between the head plate and the base plate; a piston/rod assembly mounted to reciprocate vertically in the inner tube between a retracted, compressed position and an extended, rest position; a valve ring coaxially mounted around the rod to reciprocate between the main piston and head plate; a primary gas chamber; a relief chamber; seals for preventing fluid flow from the primary and relief chambers; a passageway providing communication between the primary gas chamber and relief chamber; and, valve apparatus for controlling fluid flow between the primary and relief chambers. The valve apparatus operates to open and close the fluid flow as a function of the position and direction of travel of the piston/rod assembly.

16 Claims, 11 Drawing Sheets

SOFT-START, SOFT-RETURN GAS SPRING

REFERENCE TO RELATED APPLICATIONS

This application is a continuation of U.S. patent application Ser. No. 09/783,634 filed Feb. 14, 2001 now U.S. Pat. No. 6,390,457.

FIELD OF THE INVENTION

The present invention relates to the field of gas springs, and specifically to a soft-start, soft-return gas spring for, among other things, cushioning the action of draw dies operating in stamping presses and the like.

BACKGROUND OF THE INVENTION

For many years, double action or "toggle" presses were the industry standard for forming large metal parts such as automobile hoods. A toggle press has an outer ram that comes down and binds the blank to be formed. An inner ram with a punch having the desired part shape then follows through to draw the blank into a complementary shaped die cavity. In the quest for speed and efficiency, much of the industry is now using straightside or transfer presses which is the forming press to form the initial shape from the flat metal blank. Next, the part passes through a series of individual stations or presses to complete the necessary die operations, all in one combination process. Unfortunately, toggle presses are relatively slow and form the part in an inverted or upside down orientation. In most cases then, the toggle press will most likely have to include a turnover station following the draw operation. A solution to the speed and inversion problem is the use of the straightside press. Unlike the toggle press, where the outer ram comes down gently to bind the blank for drawing, straightside presses have but a single ram with an upper platen that is actuated by the throw of the press crank cycling at up to 30 strokes per minute and 30 or more inches of stroke. With a draw die mounted in the press, the die cushion or lower binder surrounds a lower punch which defines the complementary part shape to the cavity of the upper die. The cushion floats around the punch and is supported in an up position upon a series of nitrogen gas springs that collectively offer adequate force to bind the blank for the draw operation. When the upper die binder face meets the floating cushion and blank, the blank is instantly contained between the upper and lower binder faces. The impact from the upper binder meeting the stationary die cushion is violent. The shock caused by this impact causes great damage to the press drive and creates undesirable pressure spikes in the individual cushion unit seals. After contact, because the ram force exceeds the resistance force of the gas cylinders, the ram, blank and cushion continue downward at the automatic press cycle speed until the they reach the bottom of the stroke, at which point the blank has been formed to the desired shape. At this point, the cushion cylinders have been compressed, and their resistive force has increased in accordance with the compression ratio of the nitrogen gas (Boyle's law). Cushion forces for major automotive dies commonly operate in the range of 200 to 300 tons. When the press ram reaches bottom position and starts its upstroke, the nitrogen gas cushion springs with their intensified pressure forces against the upper die throughout the die cushion upstroke. These forces cause major press drive damage, and stamping facilities have long been seeking a method to greatly reduce the cushion forces at the bottom of the press stroke so this intensified cushion force does not follow through causing such damage. Thus, while gains have been made in speed and efficiency from the use of straightside presses versus toggle presses, the wear and tear inherent in the application of straightside presses continues to plague its users.

What is needed is a way to abate or eliminate the wear and tear resulting from the high impact and recoil effect inherent in straightside presses using nitrogen spring-loaded die cushions and to reduce the die cushion "up" force such that the primary cushion force will not follow the press ram "up" stroke.

SUMMARY OF THE INVENTION

Generally speaking, apparatus is provided for cushioning the action of draw dies operating in a straightside stamping press. The apparatus includes a soft-start, soft-return gas spring that provides a die cushion with desired high tonnage resistance to movement when the press ram slams the die binders together, thereby enabling proper binding of the blank, but conversely permits the ram to return to its upper position with a greatly reduced cushion resistance throughout the full upstroke.

A soft-start, soft-return gas spring includes an outer cylindrical tube; a base plate disposed at the bottom of the tube; an annular-shaped head plate disposed at the top of the tube and having an inner cylindrically-shaped wall; an inner tube mounted to extend between the head plate and the base plate coaxially within the outer tube; a piston/rod assembly having a main piston and a rod and being coaxially mounted in the inner tube to reciprocate vertically therein between a retracted, compressed position and an extended, rest position, the rest position including at least a portion of the rod extending through the inner cylindrically-shaped wall of the head plate and upwardly of the head plate a first distance and the main piston disposed up near the head plate; an annular-shaped valve ring coaxially mounted around the rod to reciprocate between the main piston and head plate; wherein the outer tube, base plate, head plate, inner tube, and main piston define a primary gas chamber; wherein the inner tube, main piston, piston rod, valve ring and head plate define a relief chamber; seals for preventing fluid flow from the primary and relief chambers; a passageway providing communication between the primary gas chamber and relief chamber; and, valve apparatus, including the valve ring, for controlling the fluid flow through the passageway between the primary and relief chambers. The valve apparatus blocks the fluid flow from the primary to the relief chamber following a very short downstroke, soon after a load is applied to the piston rod to move the piston/rod assembly from the extended, rest position toward the retracted, compressed position. And from the retracted, compressed position, once the load is removed from the piston/rod assembly and piston/rod assembly begins to move back toward the extended, rest position under the force of the gas pressure in the primary gas chamber, the valve apparatus begins to open the passageway to allow fluid to flow from the primary chamber to the relief chamber, thus equalizing the gas pressure in the primary and relief chambers and significantly reducing the pressure biasing the piston/rod assembly back to the extended, rest position.

It is an object of the present invention to provide an improved gas spring.

Further objects and advantages will become apparent from the following description of the preferred embodiment.

DESCRIPTION OF THE PREFERRED EMBODIMENT

Figure 1:
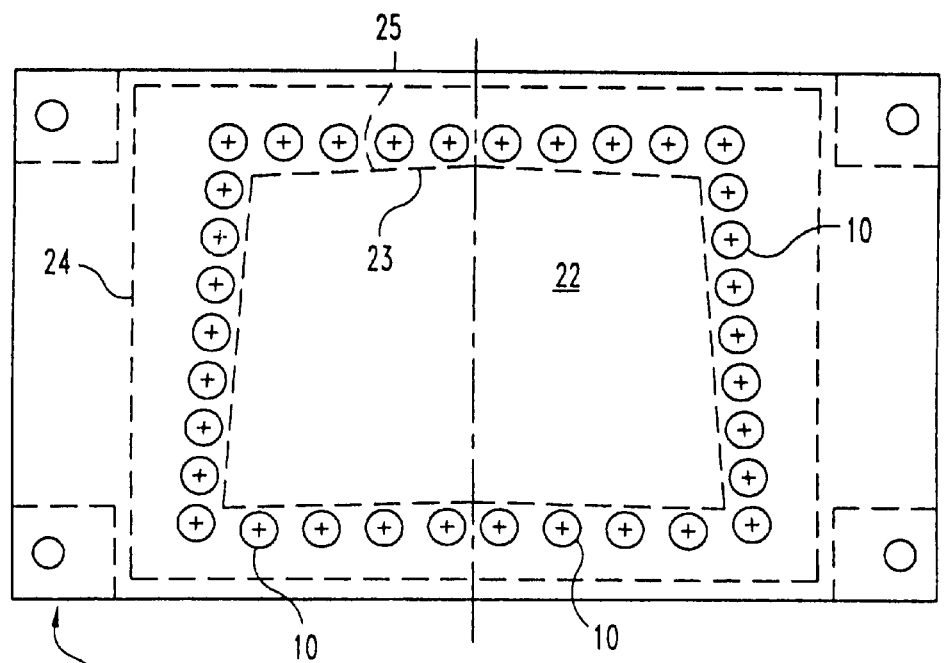
FIG. 1 is a plan, diagrammatic view of a draw die 9 equipped with apparatus for cushioning the action of the die in accordance with the preferred embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, and that any alterations or modifications in the illustrated device, and any further applications of the principles of the invention as illustrated therein are contemplated as would normally occur to one skilled in the art to which the invention relates.

Numerical values provided herein for certain dimensions, weights, pressures and other characteristics are for purposes of describing a particular embodiment. It should be understood that such values will vary with the type and size of the part to be formed and with the desired operating characteristics of the corresponding press and/or gas spring.

Figure 2:
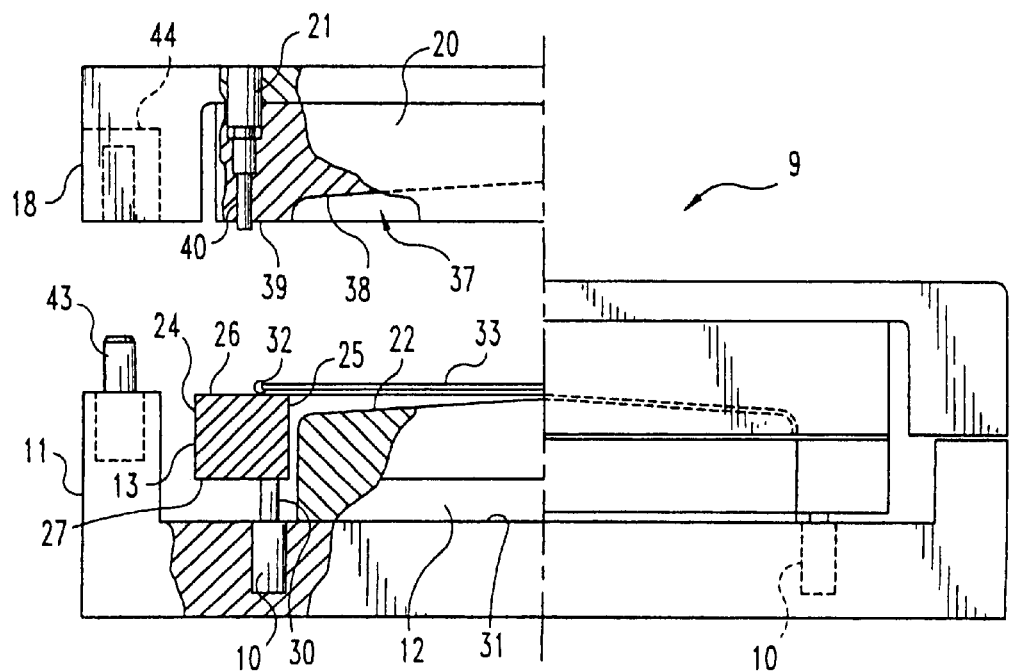
FIG. 2 is a side, elevational view, of the draw die 9 of FIG. 1 equipped with apparatus for cushioning the action of the die in accordance with the preferred embodiment of the present invention, and with portions thereof broken out in cross-section for clarity, and showing the die 9 in both open and closed positions.

Referring now to FIGS. 1 and 2, there is shown a draw die 9 operable within a straightside press equipped with soft-start, soft-return gas springs 10 for cushioning the action of the die in accordance with the preferred embodiment of the present invention. Die 9 generally includes a lower die shoe 11, a punch 12, a pad or "cushion" 13, a plurality of soft-start, soft-return gas springs 10, an upper die shoe 18, upper die 20, and a set of hydraulic shock absorbers 21. As with other presses of this type, punch 12 is fixedly mounted to lower shoe 11 and has a top surface 22 which defines the desired shape of the part to be formed. For purposes of discussion of the current embodiment, and as seen by the plan view outline 23 of punch 12 (FIG. 1), the part intended to be formed by die 10 is an automobile hood. The present invention is not intended to be limited to the formation of hoods, or of auto parts. Further, the gas spring 10 of the present invention is contemplated to have applications outside of the stamping industry.

Cushion 13 is a ring that encircles punch 12 and has an outer surface 24, an inner surface 25, an upper surface 26 and a lower surface 27. Cushion 13 thus defines a central hole that is bounded by inner surface 25 and through which extends punch 12. The outer profile of cushion 13, in overall plan view, is rectangular, as shown by the outline of outer surface 24 (FIG. 1) and the inner profile defined by inner surface 25 in plan view has the same shape as the plan view shape (at 23) of punch 13. Upper and lower surfaces 26 and 27 are parallel to each other and orthogonal to outer and inner surfaces 24 and 25. Cushion 13 is thus sized to reciprocate vertically around punch 12, but is held floating in the up and rest position (as seen in the left half of FIG. 2) by the plurality of gas springs 10. Each of the gas springs 10, as will be described in greater detail herein; is a nitrogen gas spring with a piston rod 30 that may reciprocate between a retracted, compressed position and an extended, rest position. In the rest position, piston rod 30 extends about 6 inches from the surface 31 of lower shoe 11. In its compressed position (right half of FIG. 2), piston rod 30 is flush or extends just slightly above surface 31.

A plurality of lock beads or draw beads 32 for binding a blank 33 extend upwardly from upper surface 26, proximal to inner surface 25, and thus surround punch 12. Gas springs 10 are sized so that, in the rest position, piston rods 30 support cushion 13 high enough so that its upper surface 26 is approximately one inch above the highest point on punch 12. That is, in the rest position, a blank 33 may be positioned over punch 12 and supported around its periphery by beads 32 of cushion 13, as shown in the left side of FIG. 2. Depending on the size of the blank and on the profile of the punch, blank 33 will not touch punch 12 in this rest position, prior to the descent of the upper die 20. The plurality of the gas springs 10 sit within cavities in lower die shoe 11 in a spaced relationship around punch 12 and under cushion 13. In the present embodiment, there are 34 gas springs 10.

Upper die 20 defines a cavity 37 with an inner surface 38 that mates with the top surface 22 of punch 12 to define the shape of the part to be formed. Upper die 20 also defines a lower, planar surface 39 and is mounted to the underside of upper die shoe 18 which is mounted to a ram (not shown) which drives shoe 18 and upper die 20 down against cushion 13 and punch 12 to form the desired part. The set of hydraulic shock absorbers 21 comprises four shock absorbers 21 that are mounted at the corners of upper die 20. Each shock absorber 21 engages with a plunger or adapter 40 that extends one inch below lower planar surface 39. The purpose for using shock absorbers is to start the down motion of the cusion before the binders impact. Lower die shoe 11 has four guide posts 43, one extending upwardly from each of its corners, and upper die shoe 18 has a corresponding bushing 44 at each of its corners, each bushing sized to receive a guide post therein to ensure alignment between upper shoe 18 and lower die shoe 11 when the two are brought together.

Figure 3:
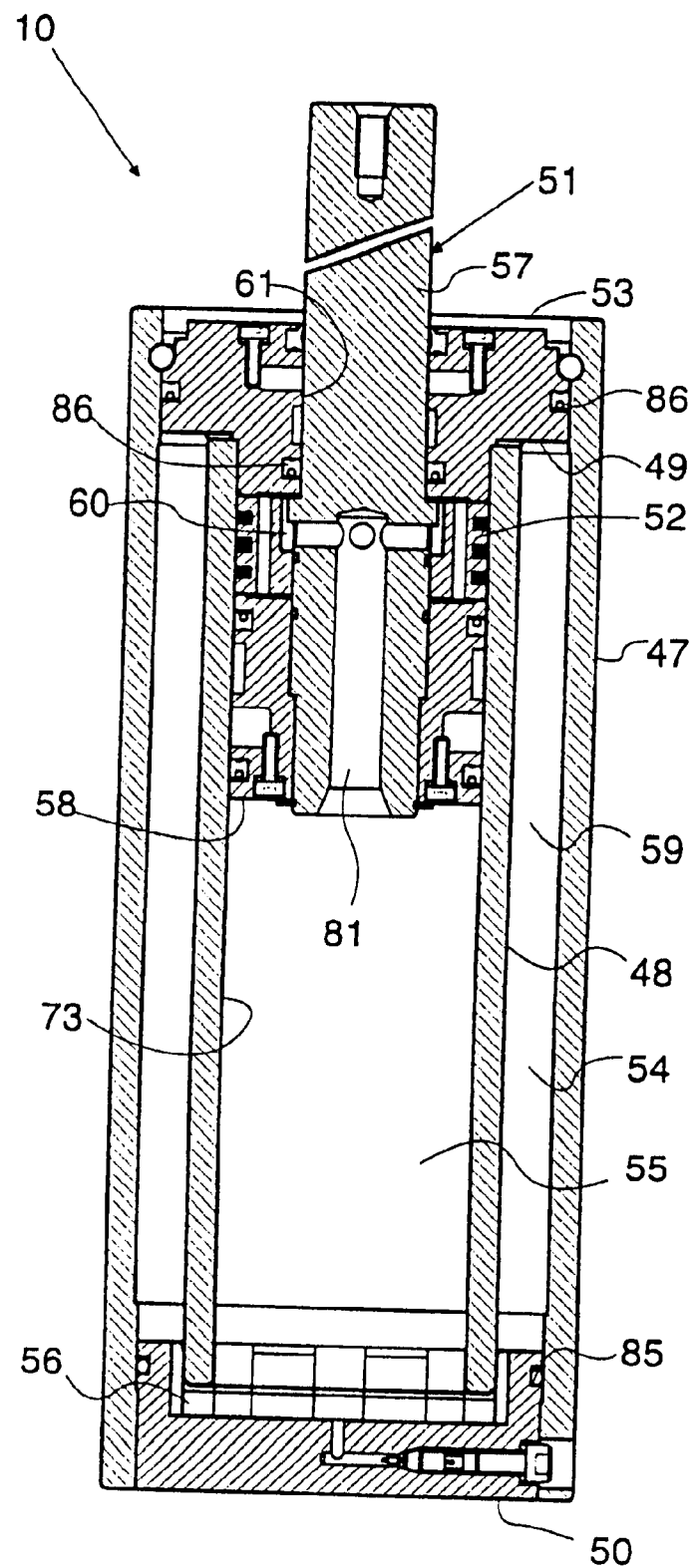
FIG. 3 is side, cross-sectional view of a soft-start, soft-return gas spring 10 for use in applications such as the die 9 of FIG. 2 in accordance with the preferred embodiment of the present invention, and shown in the extended, rest position.
Figure 4:
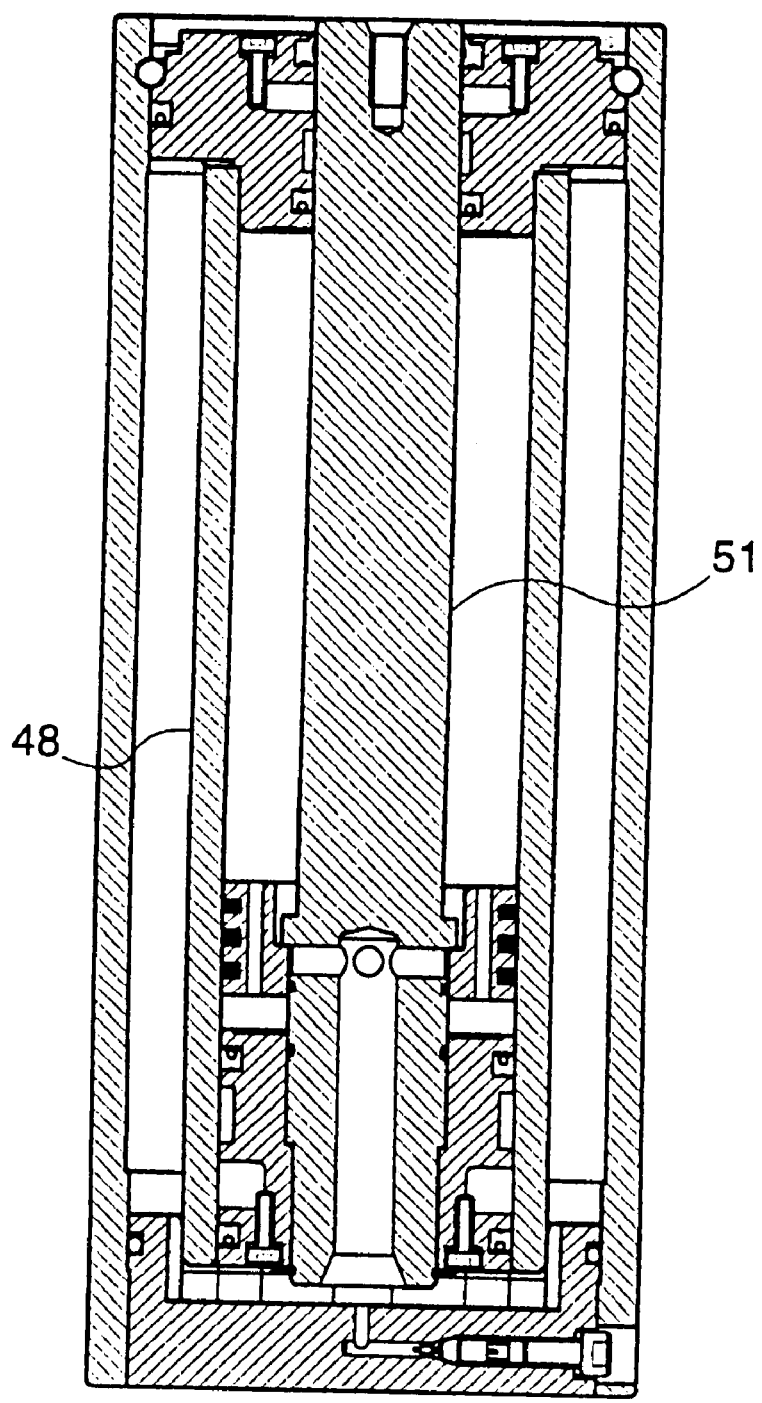
FIG. 4 is a side, cross-sectional view of the gas spring 10 of FIG. 3 shown in the retracted, compressed position.
Figure 5:
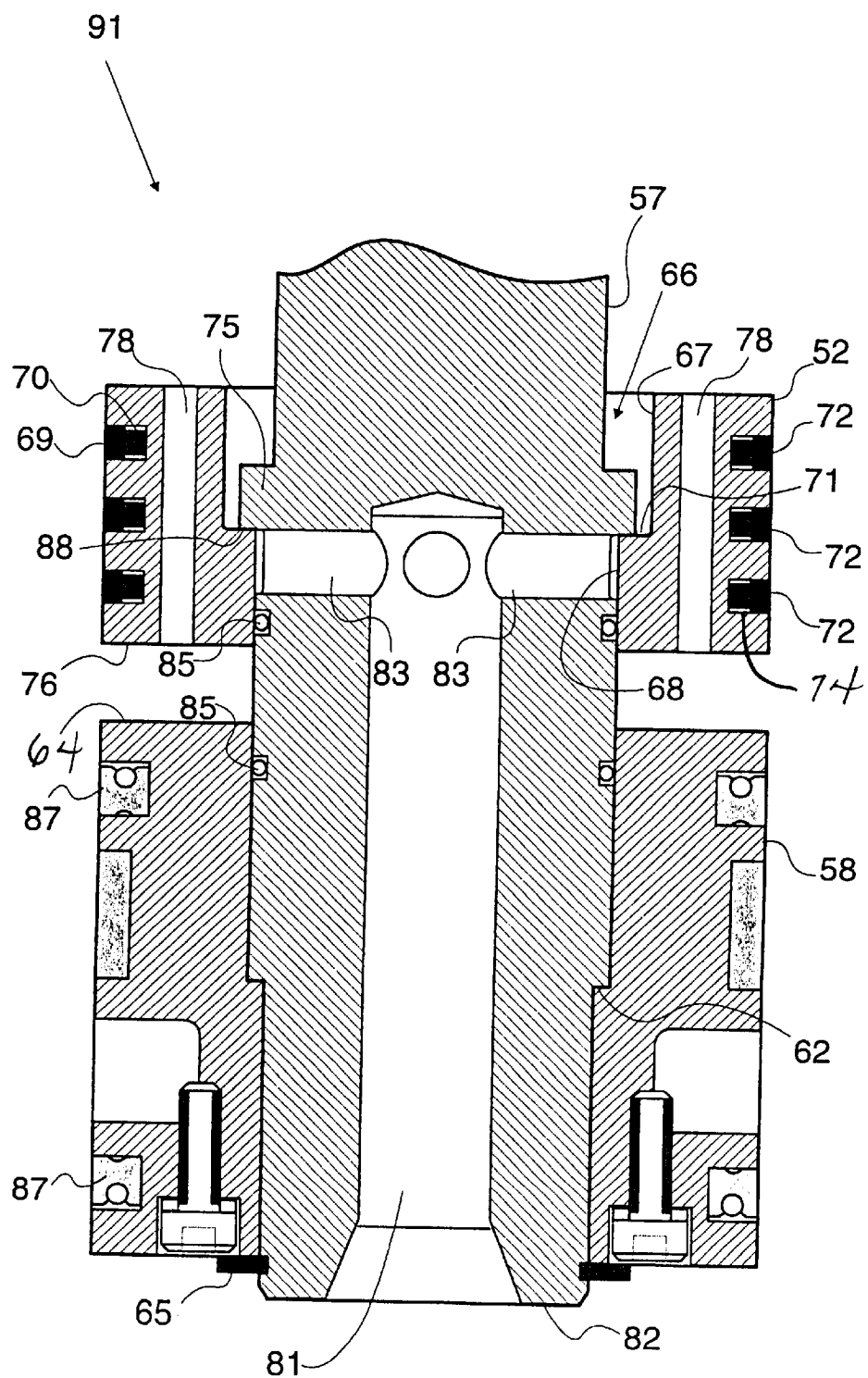
FIG. 5 is an enlarged, side, and cross-sectional view of the valve ring valve 91 of the gas spring 10 of FIG. 4, shown in the retracted, compressed position

Referring to FIGS. 3 through 5, there is shown a soft-start, soft-return gas spring 10 in accordance with the preferred embodiment of the present invention. Gas spring 10 is in the shape of a cylinder and generally includes an outer tube 47, an inner tube 48, a head plate 49, a base plate, 50, a piston and rod assembly 51, a valve ring 52, an end cover 53, and various seals, wear bands, scrapers, snap rings and lock rings as are commonly known to properly assemble and seal such gas and similar springs and cylinders. Outer tube 47 is cylindrically-shaped and has an inner diameter. Base plate 50 forms the bottom of the gas spring cylinder. Annular-shaped head plate 49 forms the top of the cylinder and has a central opening with an inner cylindrically-shaped wall 61. Inner tube 48 is also cylindrical, having an outer diameter and an inner diameter, and is mounted to extend between head plate 49 and base plate 50, coaxially within outer tube 47.

Piston/rod assembly 51 comprises a piston rod 57 and a main piston 58. Piston rod 57 has sections of different outer diameters which produce a ledge (at 62), and main piston 58 has sections of different inner diameters that correspond to the outer diameters of piston rod 57, which produce a complementary ledge (at 62), and which together produce a close tolerance telescopic fit between piston rod 57 and main piston 58. The ledges (at 62) of piston rod 57 and main piston 58 engage to define the upper limit of main piston 58 on piston rod 57, and main piston 58 is secured thereat by a heavy duty snap ring 65 that seats within an annular groove in the bottom of piston rod 57. Piston/rod assembly 51 is coaxially mounted to vertically reciprocate within inner tube 48 between an extended, rest position (FIG. 3) and a retracted, compressed position (FIG. 4). The rest position includes the piston rod 57 of piston/rod assembly 51 extending through the inner cylindrically-shaped wall 61 of head plate 49 and upwardly of head plate 49. A primary gas chamber 59 is defined by outer tube 47, inner tube 48, head plate 49, base plate 50, and inner piston/rod assembly 51. The lower end of inner tube 48 is provided with appropriate openings 56 such that the region 54 between head and base plates 49 and 50 and between outer and inner tubes 47 and 48 is in communication with the region 55 between piston 58 and base plate 50 and within inner tube 48. That is, because of openings 56 in the bottom of inner tube 48, regions 54 and 55 together comprise primary gas chamber 59. Such communication between regions 54 and 55 may be accomplished in other manners, for example by openings or passageways defined in base plate 50. A relief chamber 60 is defined and bounded by the inner wall of inner tube 48, piston rod 57, the bottom 63 of head plate 49, and the upper face 64 of piston 58. Referring to FIG. 5, valve ring 52 is annular with a central opening 66 defined by inner cylindrical walls 67 and 68 that have different diameters. The transition between walls 67 and 68 is an annular sealing ledge 71. Valve ring 52 is disposed above main piston 58 and is provided with braking seals 72 disposed within annular grooves 74 to engage with the inner wall 73 of inner tube 48. Braking seals 72 are seals; but their function is to offer resistance to axial movement. That is, they maintain a desired outward force component, and have a sufficiently high coefficient of friction with the lubricated inner wall 91, so as to produce a friction force that resists, to the desired extent, axial movement relative to inner tube 48. In one embodiment, braking seals 72 are G-Ring 510 Series TFE Piston Seals (material no. 808) available from Zatkoff Seals & Packings, 9334 Castlegate Drive, Indianapolis, Ind. Each seal 72 comprises a fiberglass reinforced TFE outer piston ring 69 and an inner nitrile expander ring 70. The Durometer of the expander ring, and/or the inner and outer radii of the expander ring, can be selected to produce a desired resistance to axial movement. The present embodiment shows three braking seals 72, but it is believed that two braking seals 72 would be preferred.

Figure 9:
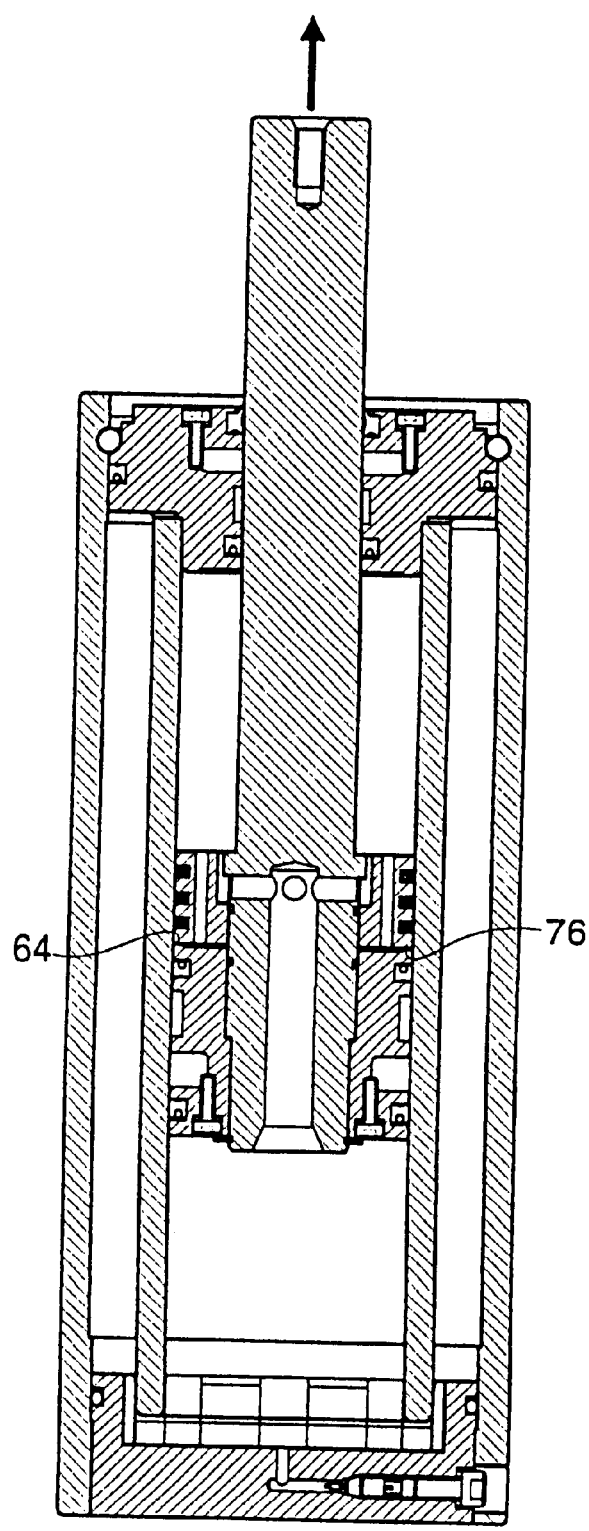
FIG. 9 is a side, cross-sectional view of the gas spring 10 of FIG. 3 showing the piston/rod assembly 51 extended from the retracted, compressed position about 3 inches (in one embodiment) toward the extended, rest position.

Piston rod 57 extends through central opening 66, and valve ring 52 thereby coaxially reciprocates along piston rod 57, but within a trap defined by the piston/rod assembly 51. The trap includes a flange 75 that extends radially outwardly from piston rod 57 a desired distance above main piston 58. The outer diameter of flange 75 is less than the inner diameter of upper wall 67 and greater than the inner diameter of lower wall 68. Valve ring 52 is thus constrained to move within the trap from a lower extreme where the bottom 76 of valve ring 52 engages the top surface 64 of piston 58 (FIGS. 3 and 9), and an upper extreme where the sealing ledge 71 engages with the disc-shaped valve seal 88 of flange 75 (FIGS. 4–7). Piston rod 57, main piston 58 and valve ring 52 are sized, configured and assembled in one embodiment so that the trap constrains valve ring 52 to a maximum range of vertical movement of 0.3 inches between upper and lower extremes. In the present embodiment the trap is formed, in part, by the integrally formed flange 75 extending from piston rod 57. Other configurations are contemplated, however, to control the range of movement of the valve ring to cut off or modulate the fluid flow between the primary and relief chambers 59 and 60. Purely by way of example, either or both ledge 71 or flange 75 could be replaced by a ring held by valve ring 52 or piston rod 57. Also, such ledge, flange, ring or other combination could be sized and configured to interact with the valve ring to limit the valve ring's travel and to control the gas flow, either directly by blocking off the passageway between the primary and relief chambers 59 and 60, or indirectly by engaging another type of seal mechanism that controls fluid flow in such passageway.

Vent holes 78 are defined to extend vertically through valve ring 52, and disc-shaped recesses 79 and 80 are defined in the bottom surface 63 of head plate 49 and the top surface 64 of piston 58, all to ensure that the gas pressure in relief chamber 60 will be maintained even in the full up (extended, rest) position of the piston.

Piston rod 57 defines a central passageway 81 extending from its lowermost surface 82 up to just below flange 75. One or more radial passageways 83 extend radially from central passageway 81, just below flange 75, and to the outer, cylindrical surface of piston rod 57. Appropriate seals, such as at 85, 86 and 87 (FIGS. 3 and 5), are provided to constrain fluids within the chambers identified herein.

Figure 6:
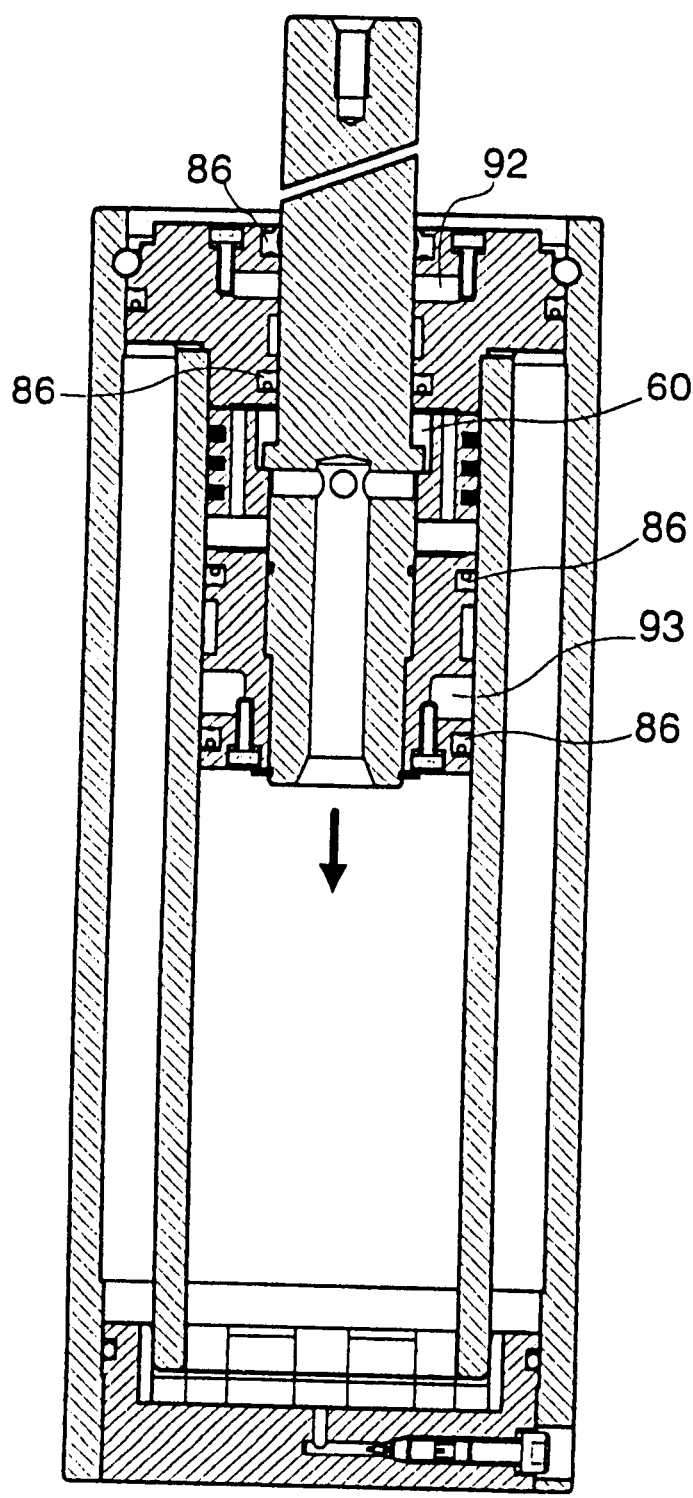
FIG. 6 is a side, cross-sectional view of the gas spring 10 of FIG. 3 showing the piston/rod assembly 51 retracted from the extended, rest position about 0.3 inches (in one embodiment)—just enough to engage annular sealing ledge 71.
Figure 7:
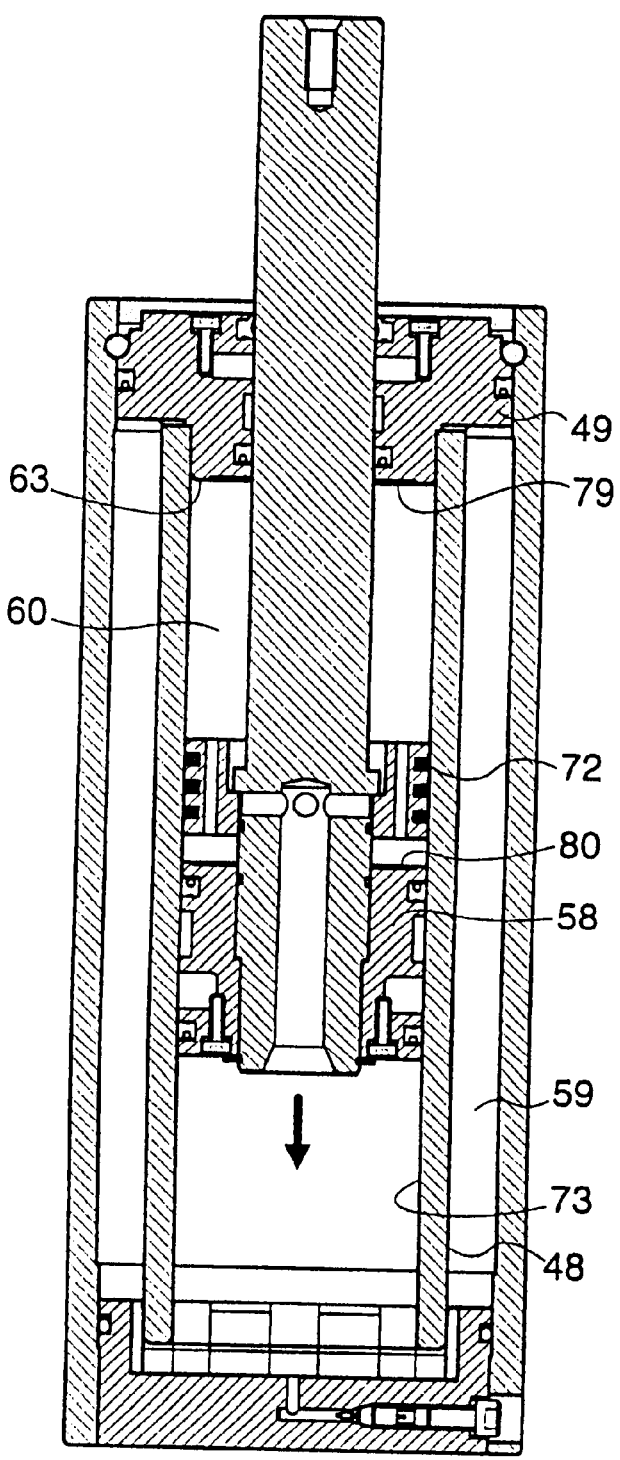
FIG. 7 is a side, cross-sectional view of the gas spring 10 of FIG. 3 showing the piston/rod assembly 51 retracted from the extended, rest position about 3 inches (in one embodiment) toward the retracted, compressed position.

In operation, from the extended, rest position shown in FIG. 3, when piston rod 57 travels downward the first 0.3 inches, valve ring 52 remains in full-up position, topped out against the bottom of head plate 49, as shown in FIG. 6. At this point, valve chamber 60 is very small and is no longer in communication with primary gas chamber 59. At this 0.3 inch downstroke position, annular flange 75 of piston rod 57 seats its lower face against annular sealing ledge 71 of valve ring 52, thus creating a valve ring valve 91 that is in its closed position (FIGS. 5 and 6). From this point and all the way through the remainder of the downstroke to the retracted, compressed position (FIG. 4), the braking action of braking seals 72 contributes a sufficient frictional force component to keep flange 75 seated in a sealing relation against ledge 71, and valve ring valve 91 stays closed.

Figure 8:
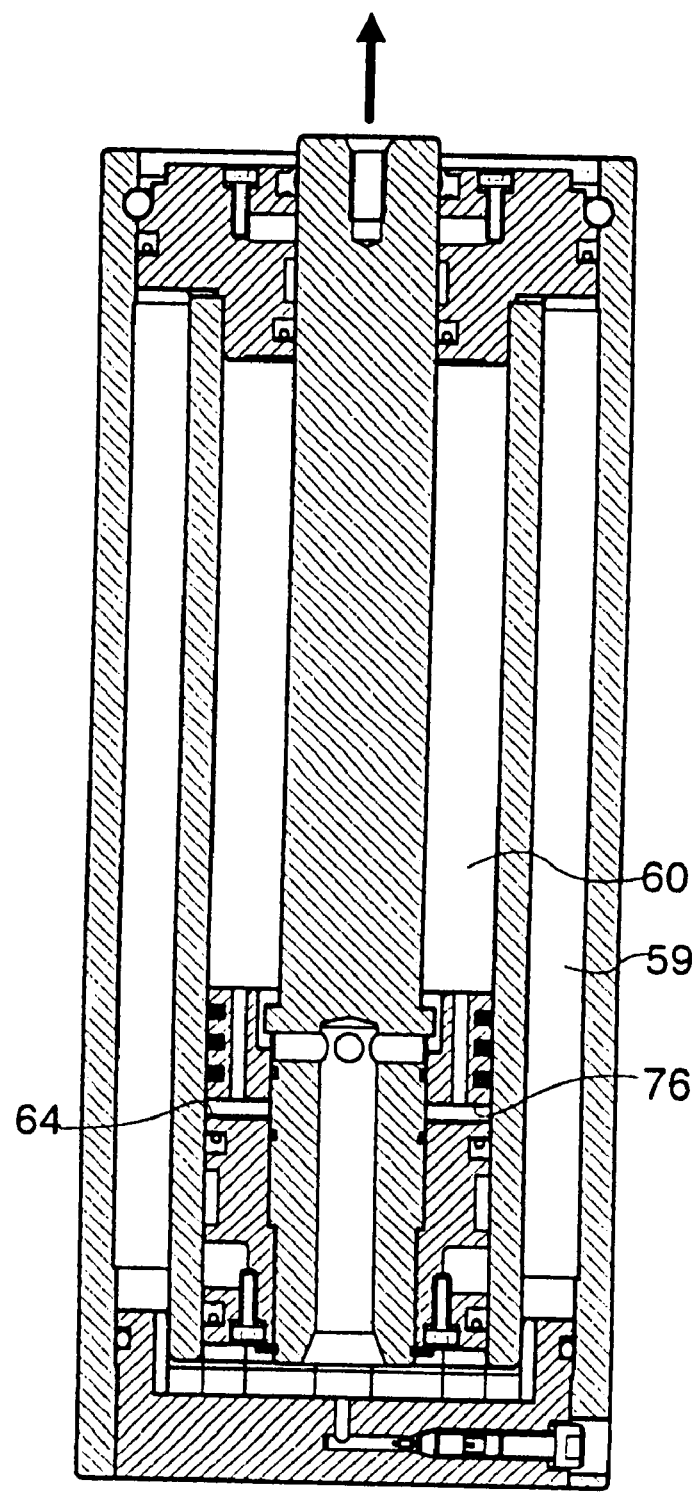
FIG. 8 is a side, cross-sectional view of the gas spring 10 of FIG. 3 showing the piston/rod assembly 51 extended upwardly from the retracted, compressed position approximately 0.15 inches (in one embodiment) enough to separate flange 75 from annular sealing ledge 71.

At the start of the upstroke (from the retracted, compressed position of FIG. 4) as the load is removed from the top of piston rod 57, piston/rod assembly 51 rises, and flange 75 disengages from valve ring 52. This is shown in FIG. 8 where piston/rod assembly 51 has risen approximately 0.15 inches (in the present embodiment) As soon as flange 75 lifts away from annular sealing ledge 71, communication is again provided through passageways 81 and 83 between the primary and relief chambers 59 and 60. As main piston 58 continues to rise, its top surface 64 engages with the bottom surface 76 of valve ring 52 (FIG. 9) and pushes it to full upstroke position (FIG. 3). At this point, flange 75 is again 0.3 inches above the seat position on annular sealing ledge 71 of valve ring 52.

The three gas chambers are: (1) outer chamber (region 54), (2) the chamber under the piston (region 55), and (3) the chamber that develops above the piston as the piston strokes downward (relief chamber 60). The outer chamber 54 and the chamber 55 beneath the piston are permanently interconnected such that the gas beneath the piston simply displaces into the outer chamber 54 that serves as a surge tank. The volume ratio of the gas below the piston (including the volume of the outer chamber 54) with the piston rod stroked full out (FIG. 3) vs. the rod stroked full in (FIG. 4) is in this case 1.58 to 1. This ratio is approximately the same as existing industrial gas springs. Important to the success of the gas spring 10 of the present invention is the technique of controlling the flow of gas below main piston 58 into the chamber above main piston 58. When the gas pressure is normalized between the chamber above main piston 58 and the chamber below main piston 58, the net force of main piston 58 reduces to the piston rod area times the gas pressure in such chambers. In the model illustrated herein, this force drops immediately (i.e., within 0.15 inches of upstroke) to about 16% of the downstroke force. Controlling the gas flow is accomplished by providing ports through the lower end of the piston rod 57 that interconnect the chambers above and below main piston 58. The valve ring 52 operates as a check valve that opens and closes the ports interconnecting the chambers 59 and 60 at the appropriate times to optimize the cushion force of the gas spring 10, but also to significantly reduce the pressure when it can be most damaging to the die or other machinery or components with which it interacts.

Figure 10:
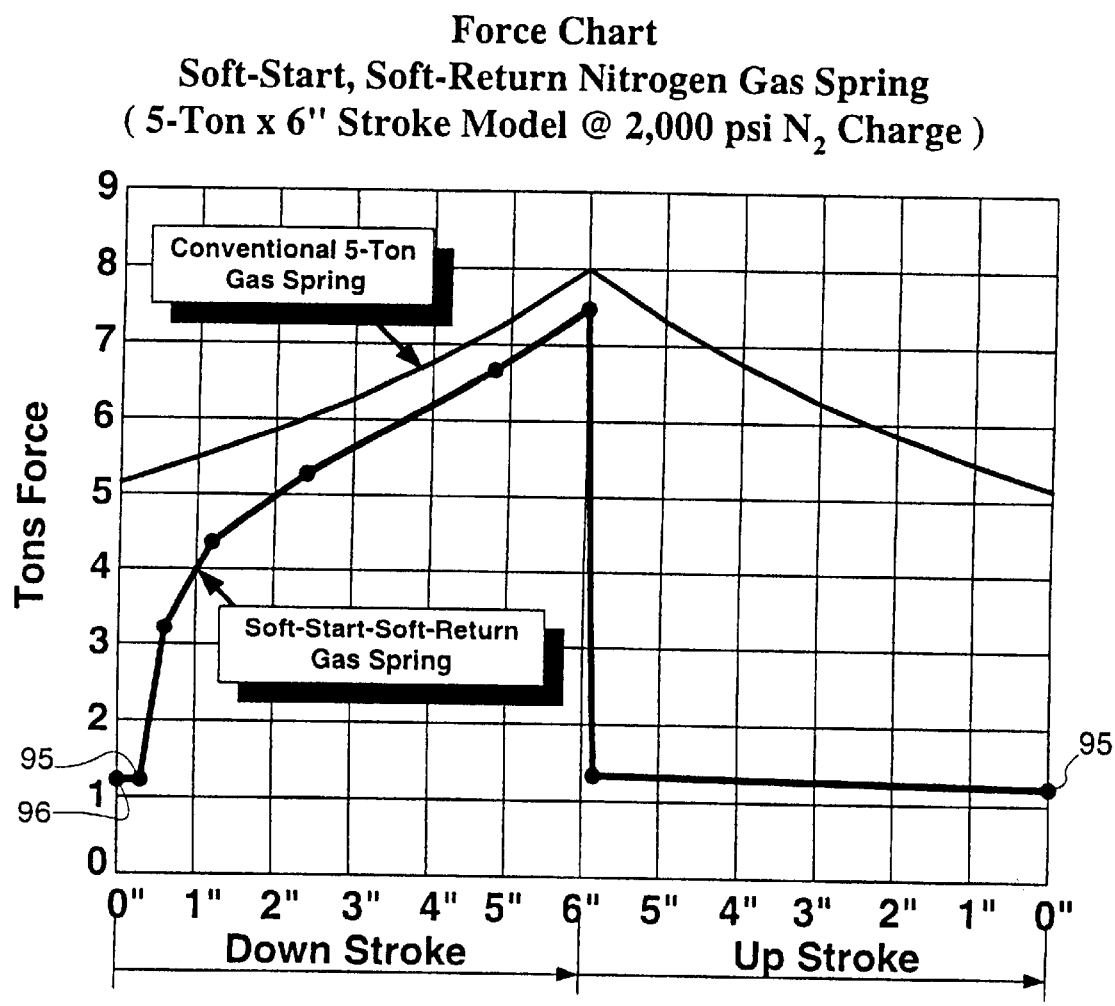
FIG. 10 is a graph illustrating the optimum force output of a soft-start, soft-return gas spring, in accordance with the present invention, as a function of the movement of piston rod 57 from the extended, rest position (FIG. 3) to the retracted, compressed position (FIG. 4) and back.

At full upstroke position (the extended, rest position of FIG. 3), the interconnecting ports are open allowing the gas pressure above and below main piston 58 to be in equilibrium, which renders the net force for the first 0.3 inches of downstroke to be only the cross-sectional area of the piston rod 57 times the gas pressure. However at precisely 0.3 inches downstroke (FIG. 6) the projecting flange 75 of piston rod 57 rod seats against the seal face of ledge 71, thereby sealing off any further gas flow from the chamber below the principal piston. From this point throughout the remainder of the downstroke, valve ring valve 91 is closed. This causes the net force of the unit to be the entire cross-sectional area of the main piston face times the gas pressure (minus the effect of the fast decaying pressure of the 0.3 inches high column of gas that was above the piston before the seal faces contacted). Shown in FIG. 10 is a force graph illustrating the optimum force output of a soft-start, soft-return gas spring, in accordance with the present invention, as a function of the movement of piston rod 57 from the extended, rest position (FIG. 3) to the retracted, compressed position (FIG. 4) and back. The graph incorporates Boyle's law, which states that, when the temperature is kept constant, the volume of a given mass of an ideal gas varies inversely with the pressure to which the gas is subjected. The computations were based on stroke increments starting at 0.3 inches and progressing through 0.6 inches, 1.2 inches, 2.4 inches, 4.8 inches and 6.0 inches of downstroke. FIG. 10 also shows the force vs. stroke relation for a conventional gas spring.

FIG. 10 shows the force development for the entire downstroke and the importance of the "soft-start" feature. As can be seen, the downstroke force starts out low, but with sufficient binding tonnage, it smoothly transitions to full tonnage, thereby resulting in a "soft-start." As previously noted, the gas compression ratio for the stroke-out vs. the stroke-in positions is about 1.58 to 1 for the unit illustrated herein. This means that a unit pre-charged to 2,000 psi will elevate to approximately 1.58×2,000 or about 3,100 psi at the bottom of the down-stroke. As can be seen in FIG. 10, the shape of the downstroke force curve for the conventional unit is very different. The conventional unit starts out abruptly at nearly full force.

Perhaps of greater importance is the "soft-return." A rapid decline in the upward force is accomplished by the valve ring valve 91 starting to open instantly as piston/rod 51 starts upwardly, causing the gas pressure to normalize above and below main piston 58. The reduced force is due to combined effect of reduced gas pressure and reduced effective surface area. Reduced gas pressure results from the volume added above the valve ring when the valve seat opens. Moreover, when the valve opens, the area upon which the gas pressure is acting reduces from the full cross-sectional area of the piston to only that of the rod. The combined result of these two features is that the output force is rapidly relieved near the beginning of the upstroke.

Gas spring 10 is also provided with self-lubricating oil cavities 92 and 93 (FIG. 6) which contain an amount of lubricating oil to keep piston rod 57 and main piston 58 constantly lubricated within their cylinders of travel. Cavities 92 and 93 are each flanked by seals 86.

Figure 11:
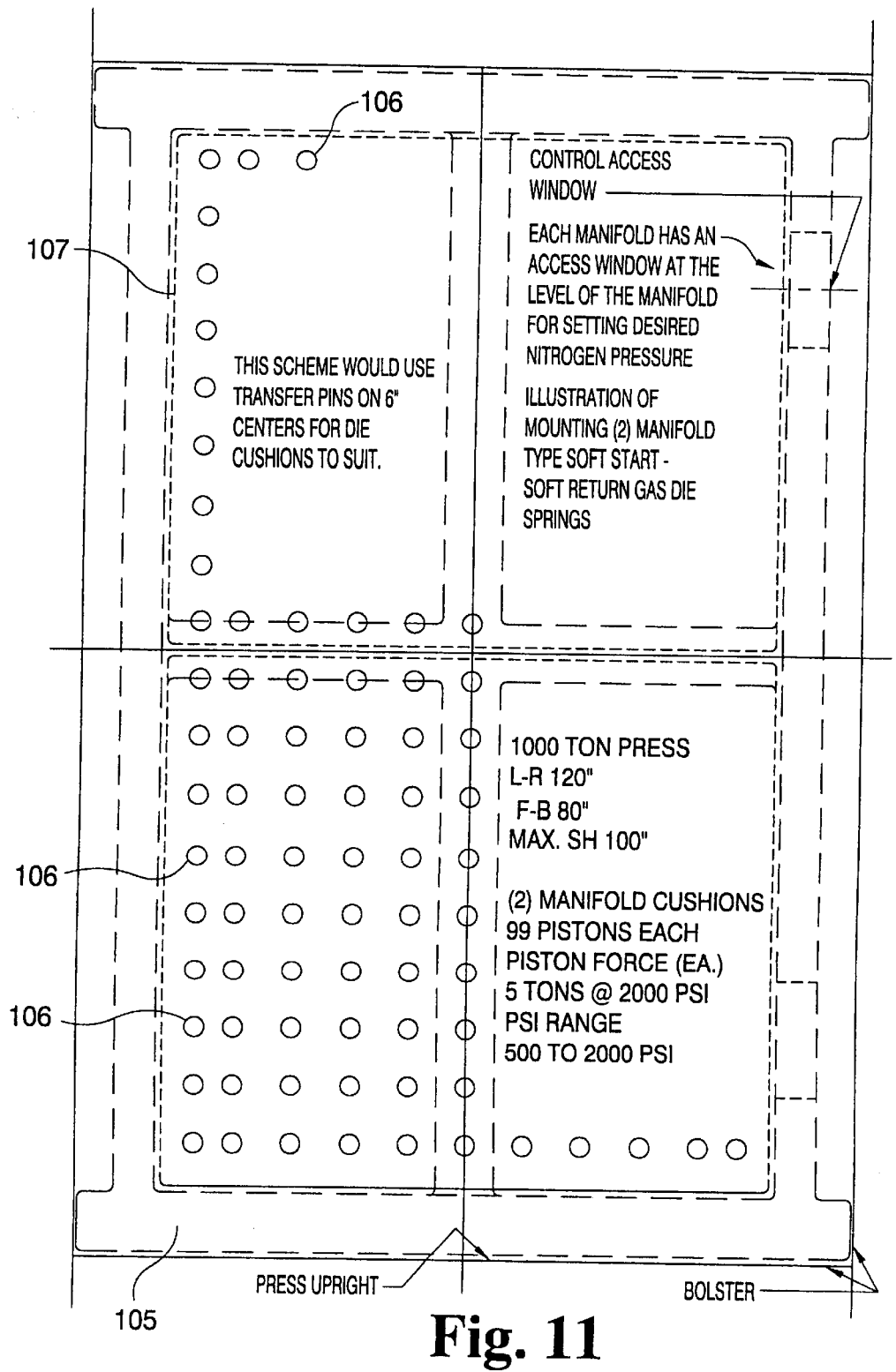
FIG. 11 is a diagrammatic view of a manifold 105 for use in press and designed to receive modified soft-start, soft-return springs 106 in accordance with another embodiment of the present invention.
Figure 12:
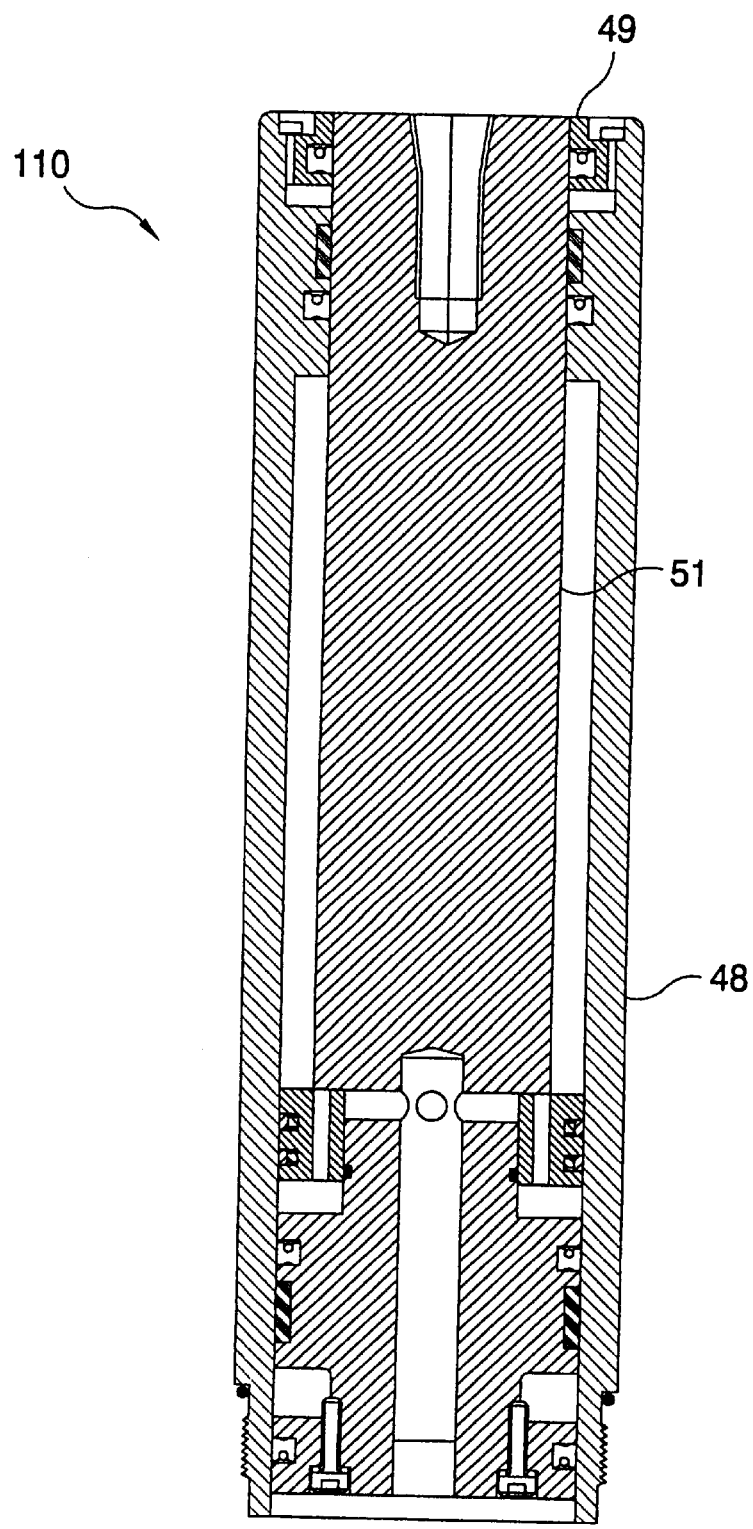
FIG. 12 is a side, cross-sectioned view of a soft-start, soft-return spring 106 for use in the manifold 105 of FIG. 11.

The above described embodiment is a single, self-enclosed unit capable of being used individually or being one of many such units in a particular application, such as shown in the straightside press of FIGS. 1 and 2. Alternative embodiments are contemplated wherein the soft-start, soft-return gas spring is constructed instead to operate as one of a network of units where the primary chambers are connected in parallel. One such configuration includes a plurality of the gas springs 10 and hoses or comparable connection apparatus to connect the primary chambers 59 of all the gas springs 10 together to be in common communication with each other. Another configuration shown in FIG. 11 includes providing a common manifold 105 with an interior chamber 107 and a plurality of ports 106, each port 106 in communication with such chamber and sized and configured to receive one gas spring. Such gas spring 110 is substantially the same as that that of FIG. 3 except that it would consist of the piston/rod assembly 51, head plate 49, inner tube 48 and valve ring 52 (FIG. 12). The inner tube 48 of each gas spring 110 would connect as by screwing into the port 106 of manifold 105. The manifold 105 would provide the additional volume (akin to a surge tank) for the plurality of gas springs 110 that the outer region 54 provides for the individual gas spring 10 of FIG. 3.

Alternative embodiments are also contemplated wherein soft-start, soft-return gas springs 10 are used in machines other than the press disclosed here. It is also contemplated that shock absorber 21 could be an option since its function is to further reduce the impact over and above the reduced impact attributed to the soft-start feature.

The minimum output force of the gas springs 10 in the extended, rest position (FIG. 3) at which contact is first made by the upper binder is indicated at 95 in FIG. 10. This output force remains substantially the same through the first 0.3 inches of travel of the piston/rod assembly 51 from the extended, rest position, as shown in FIG. 6 and is indicated at 96 in FIG. 10. This minimum output force may be varied as desired by varying the volume of the relief chamber 60, which may be done in one manner by varying the diameter of piston rod 57.

The present invention is primarily designed for use as a gas spring, the preferred gas being nitrogen. It is contemplated, however, that spring 10 could be adapted for use with a compressible liquid.

As discussed herein, the invention provides users of existing commercial gas springs the option to convert to the soft-start, soft return gas spring 10 for many or all existing applications. This is feasible since the physical shut height and girth of this new spring is compatible with existing gas springs. Such applications include, but are not limited to:

a) free standing drop-in units;

b) plate-mounted cluster units interconnected with tubular gas lines with a common fill port;

c) manifold units in which a cluster of gas springs are mounted into a manifold that contains a network of gas passageways interconnecting with the gas springs mounted thereon in which a common fill port is provided on the manifold d) a full range of flange mounting applications.

Language is used herein to indicate structural and operational relationships. It is to be understood, however, that alternate configurations are contemplated as would occur to one skilled in the art. For example, "vertical" is used herein to describe reciprocation of pistons within the gas spring 10 when it is oriented as shown in the corresponding drawings. It is nevertheless understood that the cushion unit could operate along a horizontal axis, for example, and the piston action would consequently also be along the horizontal.

While the invention has been illustrated and described in detail in the drawings and foregoing description, the same is to be considered as illustrated and not restrictive in character, it being understood that only the preferred embodiment has been shown and described and that all changes and modifications that come within the spirit of the invention are desired to be protected.

What is claimed is:

1. A gas spring, comprising:

a first tube having an inner wall;

a head plate connected to the top of said first tube and having an opening;

a base plate connected to the bottom of said first tube;

a piston/rod assembly having a piston rod extending through the opening in said head plate and having a piston with a top and bottom, said piston/rod assembly being mounted to reciprocate in said first tube between a retracted, compressed position and an extended, rest position;

wherein said first tube, piston, head plate and base plate define, at least in part, a primary gas chamber;

wherein said first tube, piston, piston rod and head plate define, at least in part, a relief chamber;

wherein said piston/rod assembly defines a passageway providing communication between the primary gas chamber and relief chamber, the passageway having a first opening to the primary gas chamber and having a second opening to the relief chamber;

a valve member separate from said piston/rod assembly and mounted with said piston/rod assembly to move between an open position uncovering one of the first and second openings and a closed position closing off said one of the first and second openings and preventing fluid flow between the primary gas chamber and the relief chamber;

seals for preventing fluid flow from the primary and relief chambers; and, at least one braking member held by said valve member and positioned between said valve member and said first tube to exert a force between said valve member and said first tube contrary to any force acting to move said valve member relative to said first tube.

2. The gas spring of claim 1 wherein said valve member is moved as a function of the position of the said piston/rod assembly within said first tube.

3. The gas spring of claim 2 wherein said valve member is a valve ring having a central opening through which extends the piston rod.

4. The gas spring of claim 3 further including trap means for limiting movement of the valve ring between the open and closed positions.

5. The gas spring of claim 4 wherein the trap means includes the piston rod having a disc-shaped valve seat, the valve seat being sized and positioned to define an upper limit of movement of the valve ring relative to said piston/rod assembly.

6. The gas spring of claim 5 wherein the closed position includes the valve ring being seated against valve seat to prevent fluid flow between the primary gas chamber and the relief chamber.

7. The gas spring of claim 6 wherein the piston defines a lower limit of movement of the valve ring relative to said piston/rod assembly and the trap means includes the valve seat being a distance above the piston to define a maximum range of movement between the upper and lower limits.

8. The gas spring of claim 7 wherein the open position includes the valve ring being seated against the piston.

9. The gas spring of claim 5 wherein the valve ring includes pressure equalization means for equalizing the pressure above and below the valve ring at all times.

10. The gas spring of claim 9 wherein the pressure equalization means includes the valve ring having a top and a bottom and defining passageway means providing fluid communication between the top and bottom of the valve ring.

11. The gas spring of claim 4 wherein said at least one braking member includes at least one braking seal connected with the valve ring and sized and configured to exert a normal force component against the inner wall of said first tube to resist axial movement of the valve ring relative to said first tube.

12. The gas spring of claim 11 wherein the valve ring defines at least one outwardly opening annular groove sized to receive the at least one braking seal.

13. The gas spring of claim 12 wherein there are three of the at least one braking seals.

14. The gas spring of claim 1 further including a surge tank in open communication with the primary gas chamber.

15. The gas spring of claim 14 wherein said surge tank includes a second tube surrounding said first tube and connected to said head and base plates, and wherein said first tube includes opening means for providing communication between the primary gas chamber and said surge tank.

16. The gas spring of claim 14 wherein said surge tank includes a manifold having at least one port sized and configured to connect with said first tube whereby said manifold is in communication with the primary gas chamber.

* * * * *